(12) United States Patent
Huang

(10) Patent No.: US 9,989,924 B2
(45) Date of Patent: Jun. 5, 2018

(54) SMART WATCH AND MOTION GAMING SYSTEM

(71) Applicant: JRD COMMUNICATION INC., Shenzhen, Guangdong Province (CN)

(72) Inventor: Yanfeng Huang, Shenzhen (CN)

(73) Assignee: JRD COMMUNICATION INC., Shenzhen, Guangdong Province (CN)

( * ) Notice: Subject to any disclaimer, the term of this patent is extended or adjusted under 35 U.S.C. 154(b) by 0 days. days.

(21) Appl. No.: 15/255,070

(22) Filed: Sep. 1, 2016

(65) Prior Publication Data

US 2016/0370767 A1 Dec. 22, 2016

Related U.S. Application Data

(63) Continuation of application No. PCT/CN2015/083584, filed on Jul. 8, 2015.

(30) Foreign Application Priority Data

Mar. 19, 2015 (CN) .......................... 2015 1 0121768

(51) Int. Cl.
*G05B 11/01* (2006.01)
*G04B 47/06* (2006.01)
(Continued)

(52) U.S. Cl.
CPC ............ *G04B 47/06* (2013.01); *A63F 13/211* (2014.09); *A63F 13/212* (2014.09);
(Continued)

(58) Field of Classification Search
None
See application file for complete search history.

(56) References Cited

U.S. PATENT DOCUMENTS

2008/0174550 A1* 7/2008 Laurila .................. A63F 13/02 345/158
2013/0090931 A1* 4/2013 Ghovanloo ............ G06F 3/011 704/275
(Continued)

FOREIGN PATENT DOCUMENTS

CN 103876401 A 6/2014
CN 103901769 A 7/2014
(Continued)

*Primary Examiner* — Brian Zimmerman
*Assistant Examiner* — Renee Dorsey
(74) *Attorney, Agent, or Firm* — Cheng-Ju Chiang

(57) ABSTRACT

A smart watch and motion gaming system are disclosed. The smart watch interacts with the motion-controlled game apparatus, and includes a controller, and a geomagnetic field sensor, a gravity sensor, a gyroscope, and a data transmission circuit, which are electrically connected to the controller. The geomagnetic field sensor detects an orientation of the smart watch and acquires the orientation data. The gravity sensor detects an inclination condition of the smart watch and acquires the inclination data. The gyroscope detects a rate of rotation of the smart watch to acquire the rotation rate data. The controller runs at least one of the geomagnetic field sensor, the gravity sensor, and the gyroscope in response to the user's selection, and accordingly collect the sensing data. The data transmission circuit transmits the collected sensing data to the motion-controlled game apparatus.

18 Claims, 2 Drawing Sheets

(51) Int. Cl.
  *A63F 13/211* (2014.01)
  *A63F 13/212* (2014.01)
  *A63F 13/235* (2014.01)
  *G06F 3/0346* (2013.01)
  *G06F 1/16* (2006.01)
  *G04D 99/00* (2006.01)
  *A63F 13/217* (2014.01)
  *G01C 9/00* (2006.01)
  *G01C 19/00* (2013.01)
  *G01C 21/08* (2006.01)
  *G01V 7/00* (2006.01)
  *G04G 21/02* (2010.01)
  *H04W 52/02* (2009.01)
  *G01C 17/00* (2006.01)

(52) U.S. Cl.
  CPC .......... *A63F 13/217* (2014.09); *A63F 13/235* (2014.09); *G04D 99/00* (2013.01); *G06F 1/1694* (2013.01); *G06F 1/1698* (2013.01); *G06F 3/0346* (2013.01); *H04W 4/80* (2018.02); *A63F 2300/105* (2013.01); *A63F 2300/1031* (2013.01); *G01C 9/00* (2013.01); *G01C 17/00* (2013.01); *G01C 19/00* (2013.01); *G01C 21/08* (2013.01); *G01V 7/00* (2013.01); *G04B 47/063* (2013.01); *G04G 21/025* (2013.01); *H04W 52/0209* (2013.01); *Y02D 70/00* (2018.01); *Y02D 70/144* (2018.01); *Y02D 70/26* (2018.01)

(56) References Cited

U.S. PATENT DOCUMENTS

| | | | |
|---|---|---|---|
| 2014/0045463 A1* | 2/2014 | Hsieh | G06F 1/1643 455/411 |
| 2014/0269225 A1 | 9/2014 | Ponsada | |
| 2015/0301506 A1* | 10/2015 | Koumaiha | G04G 21/08 368/10 |
| 2015/0341901 A1* | 11/2015 | Ryu | H04M 1/72569 455/458 |
| 2016/0257310 A1* | 9/2016 | Sprock | B60W 40/08 |

FOREIGN PATENT DOCUMENTS

| | | |
|---|---|---|
| CN | 104363987 A | 2/2015 |
| CN | 204190820 U | 3/2015 |
| WO | PCT/CN2015/083584 | 7/2015 |

* cited by examiner

SMART WATCH AND MOTION GAMING SYSTEM

CROSS-REFERENCE TO RELATED APPLICATION

This application is a continuation application of International (PCT) Patent Application No. PCT/CN2015/083584 filed on Jul. 8, 2015, now pending and designating the United States, which also claims benefit of China Patent Application No. 201510121768.9, filed on Mar. 19, 2015. The entireties of the above-mentioned patent applications are hereby incorporated by reference herein and made a part of this specification.

FIELD OF THE DISCLOSURE

The present disclosure relates to smart terminal technologies, and more particularly, to a smart watch and a motion gaming system.

BACKGROUND OF THE DISCLOSURE

Input devices for conventional game consoles may typically include keyboards, mice, wired controllers, and so forth. However, prolonged use of the above input devices for computer gaming may cause adverse impact on health because users tend to sit and use fingers to control the input devices.

To address the above drawbacks existing in traditional computer gaming, as well as to further enhance the user experience, motion gaming systems, or motion-controlled gaming systems, have been well developed. Motion gaming systems allow users to use active body movements to manipulate the game. Thus, compared with the traditional game consoles, motion gaming systems are not merely finger-controlled, thereby not only the user can achieve abundant physical exercises, but the entertainment level can be largely elevated.

Though the input devices for motion gaming systems are increasingly enriching, such as game controllers, cameras, mobile phones, mice, and dedicated gaming devices, they cannot capture the user's subtle movements as inputs for the motion gaming system, leading to an unsatisfactory realism degree. In addition, holding an input device in the hand may affect the user's movements and thus degrade the experience.

SUMMARY OF THE DISCLOSURE

A principal technical problem to be addressed by the disclosure is to provide a smart watch and a motion gaming system. The smart watch can feed substantially any subtle movements of the user as inputs for the motion gaming system, which can thus augment the authenticity of the motion-controlled gaming. In addition, the smart watch won't affect the user's normal body movements, which can further ensure a realistic sport experience.

One technical solution adopted by the disclosure is to provide a smart watch used to interact with a motion-controlled game apparatus. The smart watch may include a controller, and a geomagnetic field sensor, a gravity sensor, a gyroscope and a data transmission circuit, which are respectively electrically connected to the controller.

The geomagnetic field sensor may detect an orientation of the smart watch and acquire the corresponding orientation data of the smart watch.

The gravity sensor may detect an inclination condition of the smart watch and acquire the corresponding inclination data of the smart watch.

The gyroscope may detect a rate of rotation of the smart watch and acquire the corresponding rotation rate data of the smart watch.

The controller may run at least one of the geomagnetic field sensor, the gravity sensor, and the gyroscope according to the user's selection, and accordingly collect the sensing data.

The data transmission circuit may transmit the collected sensing data to the motion-controlled game apparatus, which may identify a corresponding action based on the sensing data.

The data transmission circuit may be a Bluetooth circuit, which may use Bluetooth 4.0 HIDS communication protocol to transmit the collected data to the motion-controlled game apparatus.

The gravity sensor and the gyroscope may be integrated into a single sensor.

The integrated sensor may be an accelerometer/gyroscope 6-axis sensor.

The smart watch may further comprise a power management circuit configured to provide power supply and associated management.

The controller may be electrically connected via an $I^2C$ interface to the geomagnetic field sensor, the gravity sensor, the gyroscope, and the data transmission circuit.

The smart watch may further provide functionalities including call, messaging, playback of audio, video files and FM radio, as well as functionalities for monitoring blood pressure, heart rate, blood sugar, consumed calories and sweat components.

Another technical solution adopted by the disclosure is to provide a motion gaming system which includes a smart watch and a motion-controlled game apparatus.

The smart watch may be used to interact with the motion-controlled game apparatus, and may include a controller, and a geomagnetic field sensor, a gravity sensor, a gyroscope and a data transmission circuit, which are respectively electrically connected to the controller.

The geomagnetic field sensor may detect an orientation of the smart watch and acquire the corresponding orientation data of the smart watch.

The gravity sensor may detect an inclination condition of the smart watch and acquire the corresponding inclination data of the smart watch.

The gyroscope may detect a rate of rotation of the smart watch, and acquire the corresponding rotation rate data of the smart watch.

The controller may run at least one of the geomagnetic field sensor, the gravity sensor, and the gyroscope according to the user's selection, and accordingly collect the sensing data.

The data transmission circuit may send the collected sensing data to the motion-controlled game apparatus.

The motion-controlled game apparatus may identify and perform a corresponding action based on the sensing data.

The present disclosure may have the following advantages over the prior art. The smart watch used to interact with the motion-controlled game apparatus may include a controller, and a geomagnetic field sensor, a gravity sensor, a gyroscope and a data transmission circuit, which are electrically connected to the controller. The geomagnetic field sensor may detect the orientation of the smart watch and acquire the corresponding orientation data. The gravity sensor may measure the inclination condition of the smart watch and acquire the corresponding inclination data. The gyroscope may detect the rate of rotation of the smart watch and thus acquire the corresponding rotation rate data. The controller may run at least one of the geomagnetic field sensor, the gravity sensor, and the gyroscope in response to the user's selection, and accordingly collect the sensing data, which will then be transmitted via the data transmission circuit to the motion-controlled game apparatus, which may thus identify a corresponding action based on the sensing data. Therefore, the smart watch can accurately capture and feed almost every subtle movement of the user to the motion-controlled game apparatus, effectively improving the realism degree of the motion gaming and thus enhancing the user experience. Furthermore, the smart watch can be worn on the user's wrist, which won't affect the user's normal movements, thus bringing the user a realistic sport experience.

DETAILED DESCRIPTION OF THE DISCLOSURE

Figure 1:
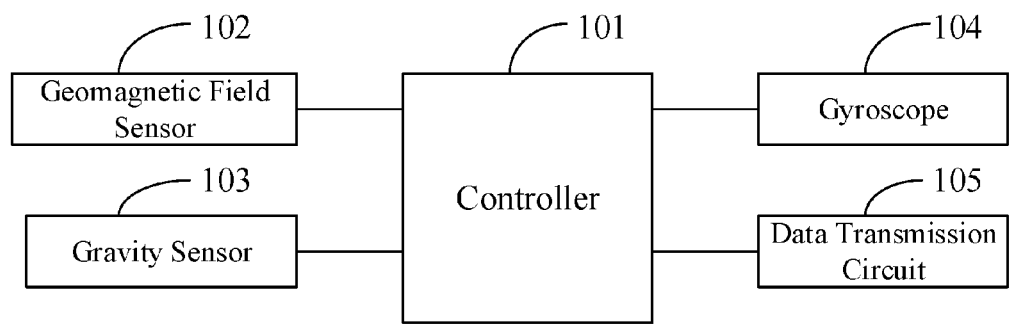
FIG. 1 is a block diagram of a smart watch according to an embodiment of the disclosure.

Referring to FIG. 1, there is shown a block diagram of a smart watch according to an embodiment of the disclosure. The smart watch may be used to interact with a motion-controlled game apparatus. Specifically, the smart watch may serve as an input device for the motion-controlled game apparatus.

The smart watch may include a controller 101, and a geomagnetic field sensor 102, a gravity sensor 103, a gyroscope 104, and a data transmission circuit 105, which are respectively electrically connected to the controller 101. Typically, the controller 101 may be connected to the geomagnetic field sensor 102, the gravity sensor 103, the gyroscope 104 and the data transmission circuit 105 via an $I^2C$ interface.

The smart watch may run the Android 4.4 system, which can offer a complete software framework with support for the gravity sensor, the gyroscope, and the geomagnetic field sensor.

The geomagnetic field sensor 102 may detect an orientation of the smart watch and acquire the corresponding orientation data.

Typically, the geomagnetic field sensor, also referred to as a geomagnetic sensor or a magnetic sensor or a magnetometer, may be hardware-based and can be used to measure the ambient geomagnetic field for all three physical axes (x, y, and z). Thus, in this embodiment the geomagnetic field sensor 102 can in effect create a compass for the smart watch into which the geomagnetic field sensor is integrated in order to measure an absolute orientation of the smart watch with respect to the North Pole of the Earth. The geomagnetic field sensor 102 may comprise, such as Hall effect sensor, magneto-diode, magneto-transistor, AMR magnetometer, GMR magnetometer, magnetic tunnel junction magnetometer, magneto-optical sensor, Lorentz force based MEMS sensor, Electron Tunneling based MEMS sensor, MEMS compass, Nuclear precession magnetic field sensor, optically pumped magnetic field sensor, fluxgate magnetometer, search coil magnetic field sensor and SQUID magnetometer, and so forth. Though in conventional applications, the geomagnetic field sensor is typically used for detecting the presence and size of a vehicle, the geomagnetic field sensor 102 is employed in the smart watch of the disclosure to detect an orientation of the smart watch, which can be based to determine the orientation of the smart watch relative to the reference frame employed. The geomagnetic field sensor 102 can be, but is not limited to, the AKM09911® chip from AsahiKASEI Company. The AKM09911® chip can provide high precision detection, and can detect an accurate orientation of the smart watch.

The gravity sensor 103 may be hardware or software based, and can measure the force of gravity that is applied to the smart watch on all three physical axes (x, y, and z). The gravity sensor can detect certain categories of motions of the smart watch, such as shake and tilt. Thus, the gravity sensor can measure the inclination condition of the smart watch, and thus collect the corresponding inclination data. A typical application example of the gravity sensor can be a gravity sensor used for tilting involving games, such as "Temple Run". To control the virtual character in the game, the user only has to tilt the device to activate the sensor, which may thus figure out the direction and magnitude of the gravitational pull and accordingly signal the central controller of the device to manipulate the virtual character to perform a corresponding operation.

The gyroscope 104 can measure a rate of rotation of the smart watch in rad/s around each of the three physical axes (x, y, and z) and thus acquire the corresponding rotation rate data of the smart watch.

The controller 101 may run at least one of the geomagnetic field sensor 101, the gravity sensor 102, and the gyroscope 103 in response to the user's selection and accordingly collect the corresponding sensing data.

The controller 101 can be, but is not limited to, the MT260® chip from Mediatek Inc.

When the smart watch is interacting with the motion-controlled game apparatus for motion gaming, the controller 101 may simultaneously run the geomagnetic field sensor 102, the gravity sensor 103 and the gyroscope 104, and respectively collect the 3-axis data of each sensor. As a result, the game-control precision can be further improved, which can add to the realism in the motion game.

The data transmission circuit 105 may transmit the sensing data, collected by the controller 101, to the motion-controlled game apparatus, which can thus identify the corresponding action based on the sensing data.

The data transmission circuit 105 may be a Bluetooth circuit, for example, but is not limited to, an MT6630® chip from Mediatek. The collected sensing data can be transferred to the motion-controlled game apparatus via the Bluetooth circuit using Bluetooth 4.0 HIDS communication protocol. The Bluetooth 4.0 HIDS communication protocol can provide easy compatibility, thus the motion gaming system is only required to support the Bluetooth 4.0 HIDS communication protocol, and no additional applications would be needed in order to receive the motion sensing data transmitted from the Bluetooth module of the smart watch. Thus, the interaction process in the motion gaming can be significantly simplified.

The Bluetooth circuit may combine the respective 3-axis data, collected from the geomagnetic field sensor 102, the gravity sensor 103, and the gyroscope, into 9-axis data, which may then be encapsulated into data units using Bluetooth 4.0 HIDS profile protocol. The data units can be sent to the motion-controlled game apparatus, which may identify the corresponding action based on the sensing data.

The data format of the data encapsulation using Bluetooth 4.0 HIDS Profile protocol may be as follows:

ASenx, ASeny, ASenz, GSenx, GSeny, GSenz, MSenx, MSeny, MSenz wherein ASenx may represent the X-axis data of the gravity sensor, ASeny may represent the Y-axis data of the gravity sensor, ASenz may represent the Z-axis data of the gravity sensor; GSenx may represent the X-axis data of the gyroscope, GSeny may represent the Y-axis data of the gyroscope, GSenz may represent the Z-axis data of the gyroscope; and MSenx may represent the X-axis data of the geomagnetic field sensor, MSeny may represent the Y-axis data of the geomagnetic field sensor, MSenz may represent the Z-axis data of the geomagnetic field sensor.

For example, the 9-axis sensor data 0.04562, 1.00112, −9.78234, 3.04562, 4.00112, −5.76334, 147.23422, 0.23421, 5.45433 may indicate that the X-axis data of the gravity sensor of the smart watch is 0.04562, the Y-axis data of the gravity sensor is 1.00112, and the Z-axis data of the gravity sensor is −9.78234; the X-axis data of the gyroscope is 3.04562, the Y-axis data of the gyroscope is 4.00112, and the Z-axis data of the gyroscope is −5.76334; and the X-axis data of the geomagnetic field sensor is 147.23422, the Y-axis data of the geomagnetic field sensor is 0.23421, and the Z-axis data of the geomagnetic field sensor is 5.45433

Note, in other embodiments that pose relatively lower precision requirements, the controller 101 can also selectively run any one or two of the geomagnetic field sensor 102, the gravity sensor 103, and the gyroscope 104, and collect the corresponding sensing data. For example, the controller 101 may selectively control the geomagnetic field sensor 102 and the gravity sensor 103 to run simultaneously, or the controller 101 may simultaneously run the gravity sensor 103 and the gyroscope 104.

Alternatively, the controller 101 may only collect the data of one or more axes of the above sensors. For example, the controller 101 may only collect the X-axis data of the geomagnetic field sensor 102, the X- and Y-axis data of the gravity sensor 103, and the X- and Y-axis data of the gyroscope 104.

Thus, the controller 101 may continuously monitor the geomagnetic field sensor 102, the gravity sensor 103, and the gyroscope 104 and simultaneously collect the sensor data every time a sensor event occurs, i.e., every time a sensor detects a change in the parameters it is measuring. The controller 101 may collect the data of the selected sensor(s) or axis (axes) according to the precision requirements, and send the sensor data via the data transmission circuit 105 to the motion-controlled game apparatus, in which the sensor data will be analyzed and processed to generate a control command used to manipulate the motion of a virtual character in the motion game. Any smart watches or smart terminals, which use any one or a combination of the above sensors, or use the data of any one axis or of multiple axes to enable the interaction with the motion-controlled game apparatus for motion gaming, shall all fall within the protection of the present disclosure.

Figure 2:
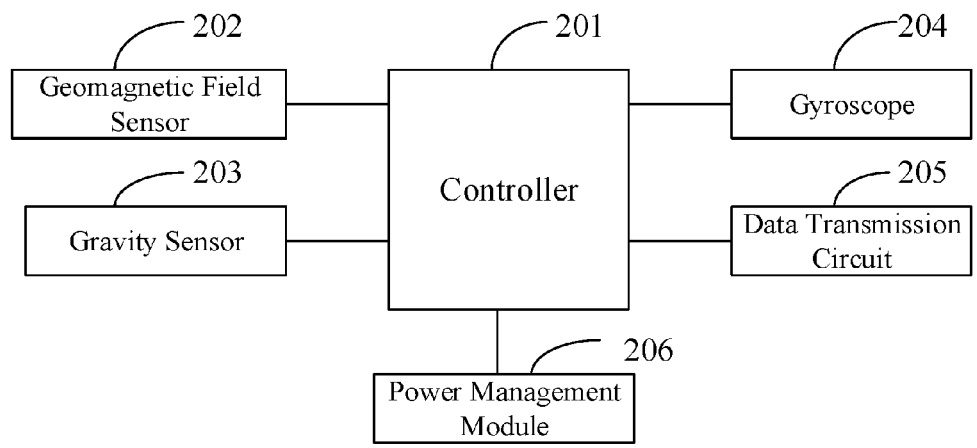
FIG. 2 is a block diagram of a smart watch according to another embodiment of the disclosure.

Referring now to FIG. 2, there is shown a block diagram of a smart watch according to another embodiment of the disclosure. The smart watch may further include a power management module 106 configured to provide power management, and charge and discharge management.

The smart watch may further provide functionalities including call, messaging, playback of music and video files, FM radio, and photography, namely, the smart watch may have the above basic features of a smart terminal and an upper computer. Furthermore, the smart watch may provide functionalities for monitoring the blood pressure, heart rate, blood sugar, consumed calories and sweat components, namely, the functions for monitoring the user's health. In other embodiments the smart watch may offer other functionalities, including voice input and output, gesture recognition, etc.

Figure 3:
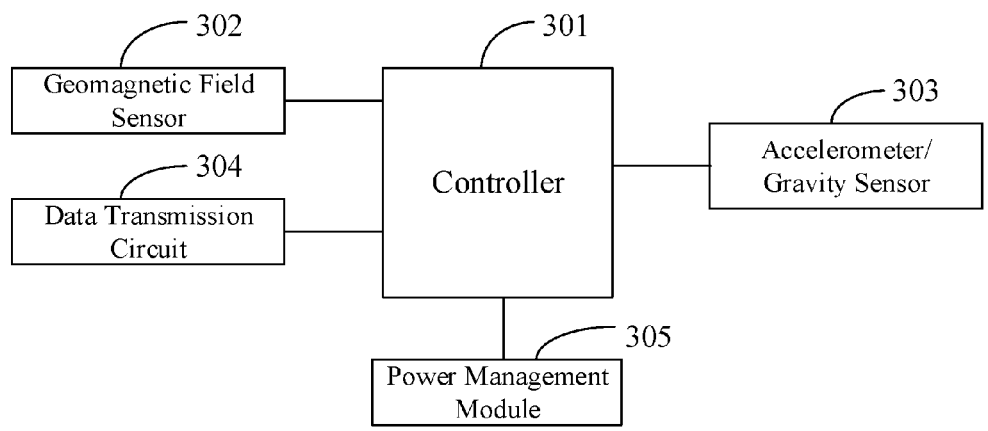
FIG. 3 is a block diagram of a smart watch according to yet another embodiment of the disclosure.

Referring now to FIG. 3, there is shown a block diagram of a smart watch according to yet another embodiment of the disclosure.

The smart watch according to this embodiment differs from that of the above embodiment in that, in the smart watch the gravity sensor and gyroscope may be integrated into one single sensor 303, which may be an accelerometer/gyroscope sensor with both gravity sensor and gyroscope capabilities. The accelerometer/gyroscope sensor can selectively collect the 3-axis data of the gravity sensor and/or 3-axis data of the gyroscope. For example, the accelerometer/gyroscope sensor may be the LSM6DS3® from STMicroelectronics featuring low power consumption and high detection precision capability. Other chips with both the gravity sensor and gyroscope functionalities can also be employed.

Distinguished from the prior art, the smart watch used for interaction with the motion-controlled game apparatus according to this embodiment includes a controller, and a geomagnetic field sensor, a gravity sensor, a gyroscope and a data transmission circuit, which are respectively electrically connected to the controller. The geomagnetic field sensor is used to detect the orientation of the smart watch and acquire the corresponding orientation data, the gravity sensor is used to detect the inclination condition of the smart watch and acquire the corresponding inclination data, the gyroscope is used to detect the rate of rotation of the smart watch and acquire the corresponding rotation rate data, the controller may run at least one of the geomagnetic field sensor, the gravity sensor and the gyroscope in response to the user's selection and accordingly collect the sensing data, which may then be transmitted via the data transmission circuit to the motion-controlled game apparatus, which may thus identify a corresponding action based on the sensing data. Thus, the smart watch can capture and reflect substantially every subtle movement of the user to the motion-controlled game apparatus in a more convenient and accurate manner, thereby effectively increasing the realism degree of the motion gaming and thus further enhancing the user experience. Furthermore, the smart watch can be worn on the user's wrist, which won't affect the user's normal movements, bringing the user a realistic sport experience.

Figure 4:
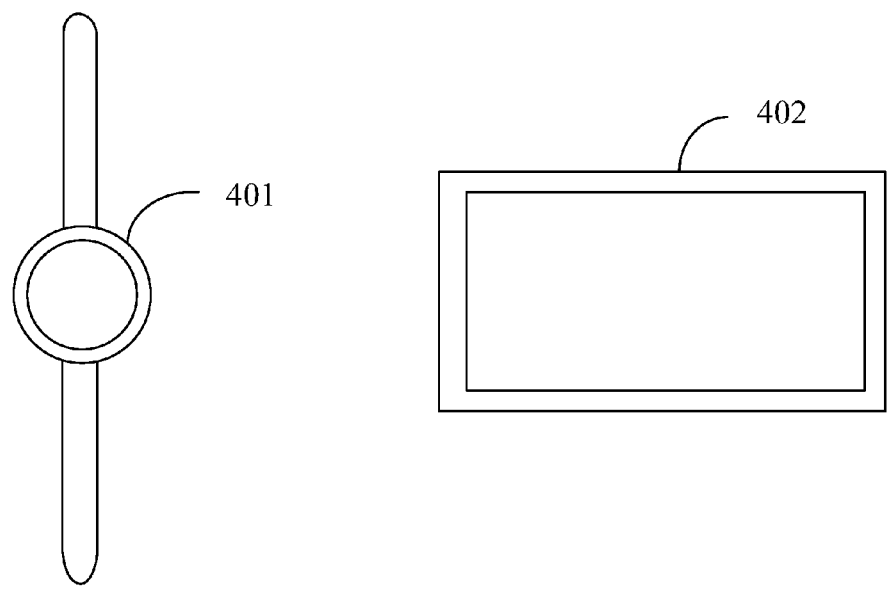
FIG. 4 is a block diagram of a motion gaming system according to an embodiment of the disclosure.

Referring now to FIG. 4, there is shown a block diagram of a motion gaming system according to an embodiment of the disclosure. The motion gaming system may include a smart watch 401 according to any one of the above embodiments, and a motion-controlled game apparatus 402. The motion-controlled game apparatus 402 may include smart televisions, smart phones, or tablet computers, which can receive the motion sensing data, and identify the corresponding action based on the sensing data to enable the interaction required for the motion gaming.

The above description is merely the embodiments of the disclosure, but is not limiting the scope of the disclosure. Any equivalent structures or flow transformations made to the disclosure, or any direct or indirect applications of the disclosure on other related fields, shall all be covered within the protection of the disclosure.

The invention claimed is:

1. A smart watch used to interact with a motion-controlled game apparatus, comprising a controller, and a geomagnetic field sensor, a gravity sensor, a gyroscope, and a data transmission circuit, which are respectively electrically connected to the controller; wherein
the geomagnetic field sensor is configured to detect an orientation of the smart watch and acquire corresponding orientation data of the smart watch;
the gravity sensor is configured to detect an inclination condition of the smart watch and acquire corresponding inclination data of the smart watch;
the gyroscope is configured to detect a rate of rotation of the smart watch and acquire corresponding rotation rate data of the smart watch;
the controller is configured to run at least one of the geomagnetic field sensor, the gravity sensor, and the gyroscope in response to a user's selection, and accordingly collect at least one-axis data of the at least one of the orientation data, the inclination data and the rotation rate data; and
the data transmission circuit is configured to combine the collected at least one-axis data in an order of the orientation data, the inclination data and the rotation rate data which are implemented in sequence, and transmit the combined data to the motion-controlled game apparatus, which identifies a corresponding action based on the sensing data, wherein the data transmission circuit is a BLUETOOTH circuit, which transmits the combined data to the motion-controlled game apparatus using BLUETOOTH 4.0 HIDS communication protocol.

2. The smart watch according to claim 1, wherein the gravity sensor and the gyroscope are integrated into one single sensor.

3. The smart watch according to claim 2, wherein the single sensor is an accelerometer/gyroscope 6-axis sensor.

4. The smart watch according to claim 1, further comprising a power management circuit configured to provide power management, and charge and discharge management.

5. The smart watch according to claim 1, wherein the controller is electrically connected to the geomagnetic field sensor, the gravity sensor, the gyroscope, and the data transmission circuit via an I²C interface.

6. The smart watch according to claim 1, wherein the smart watch further provide functionalities comprising call, messaging, playback of audio and video files, FM radio, and photography.

7. A smart watch used to interact with a motion-controlled game apparatus, comprising a controller, and a geomagnetic field sensor, a gravity sensor, a gyroscope, and a data transmission circuit, which are respectively electrically connected to the controller; wherein
the geomagnetic field sensor is configured to detect an orientation of the smart watch and acquire corresponding orientation data of the smart watch;
the gravity sensor is configured to detect an inclination condition of the smart watch and acquire corresponding inclination data of the smart watch;
the gyroscope is configured to detect a rate of rotation of the smart watch and acquire corresponding rotation rate data of the smart watch;
the controller is configured to run at least one of the geomagnetic field sensor, the gravity sensor, and the gyroscope in response to a user's selection, and accordingly collect at least one-axis data of the at least one of the orientation data, the inclination data and the rotation rate data; and
the data transmission circuit is configured to combine the collected at least one-axis data in an order of the orientation data, the inclination data and the rotation rate data which are implemented in sequence, and transmit the combined data to the motion-controlled game apparatus, which identifies a corresponding action based on the combined data.

8. The smart watch according to claim 7, wherein the data transmission circuit is a BLUETOOTH circuit, which uses BLUETOOTH 4.0 HIDS communication protocol to transmit the combined data to the motion-controlled game apparatus.

9. The smart watch according to claim 7, wherein the gravity sensor and the gyroscope are integrated into one single sensor.

10. The smart watch according to claim 9, wherein the single sensor is an accelerometer/gyroscope 6-axis sensor.

11. The smart watch according to claim 7, further comprising a power management circuit configured to provide power management, and charge and discharge management.

12. The smart watch according to claim 7, wherein the controller is electrically connected to the geomagnetic field sensor, the gravity sensor, the gyroscope, and the data transmission circuit via an I²C interface.

13. The smart watch according to claim 7, wherein the smart watch further provide functionalities comprising call, messaging, playback of audio and video files, FM radio, and photography.

14. A motion gaming system, comprising a smart watch and a motion-controlled game apparatus; wherein
the smart watch is configured to interact with the motion-controlled game apparatus, and comprises a controller, and a geomagnetic field sensor, a gravity sensor, a gyroscope, and a data transmission circuit, which are respectively electrically connected to the controller; wherein
the geomagnetic field sensor is configured to detect an orientation of the smart watch and acquire corresponding orientation data of the smart watch;
the gravity sensor is configured to detect an inclination condition of the smart watch and acquire corresponding inclination data of the smart watch;
the gyroscope is configured to detect a rate of rotation of the smart watch and acquire corresponding rotation rate data of the smart watch;
the controller is configured to run at least one of the geomagnetic field sensor, the gravity sensor, and the gyroscope in response to a user's selection, and accordingly collect at least one-axis data of the at least one of the orientation data, the inclination data and the rotation rate data;
the data transmission circuit is configured to combine the collected at least one-axis data in an order of the orientation data, the inclination data and the rotation rate data which are implemented in sequence, and transmit the combined data to the motion-controlled game apparatus; and
the motion-controlled game apparatus is configured to identify a corresponding action based on the combined data.

15. The motion gaming system according to claim 14, wherein the data transmission circuit is a BLUETOOTH circuit, which uses BLUETOOTH 4.0 HIDS communication protocol to transmit the combined data to the motion-controlled game apparatus.

16. The motion gaming system according to claim 14, wherein the gravity sensor and the gyroscope are integrated into one single sensor.

17. The motion gaming system according to claim 16, wherein the single sensor is an accelerometer/gyroscope 6-axis sensor.

18. The motion gaming system according to claim 14, wherein the motion-controlled game apparatus comprises one of smart television, smart phone, and tablet computer.

\* \* \* \* \*